(Model.)
L. STOW.
ANIMAL POKE.
No. 246,834. Patented Sept. 6, 1881.
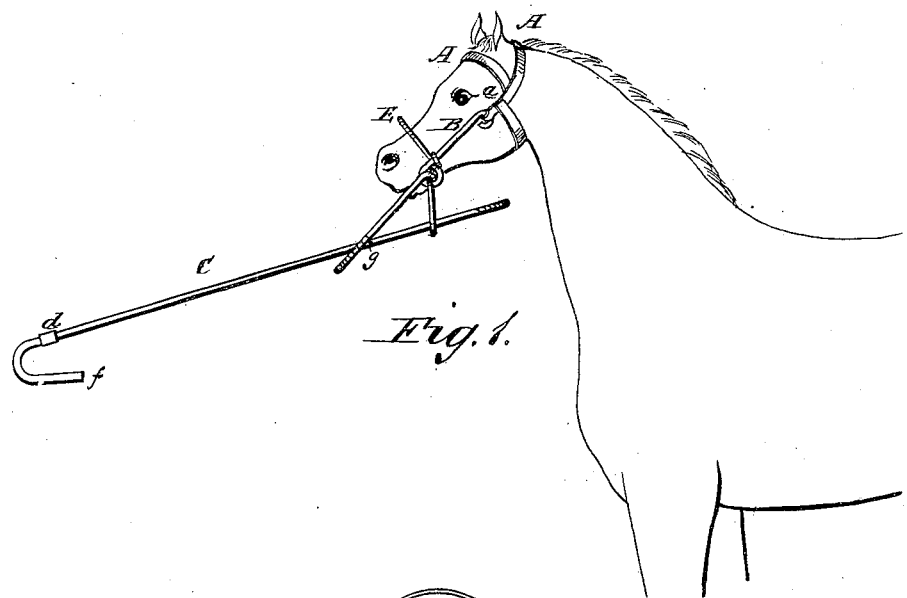
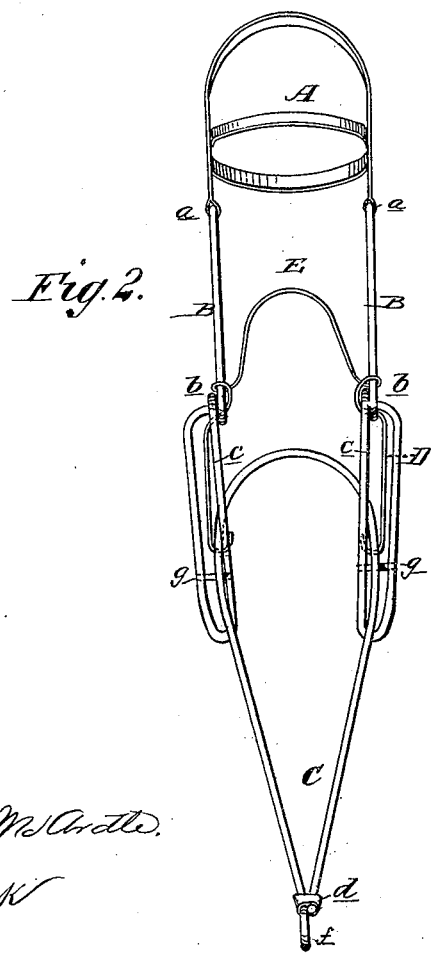
WITNESSES:
Francis McArdle
C. Sedgwick
INVENTOR:
L. Stow
BY Munn & Co
ATTORNEYS.

UNITED STATES PATENT OFFICE.

LORENZO STOW, OF ROME, TENNESSEE.

ANIMAL-POKE.

SPECIFICATION forming part of Letters Patent No. 246,834, dated September 6, 1881.

Application filed April 6, 1881. (Model.)

*To all whom it may concern:*

Be it known that I, LORENZO STOW, of Rome, in the county of Smith and State of Tennessee, have invented a new and Improved Animal-Poke, of which the following is a full, clear, and exact description.

A serious objection to the pokes in common use for horses is, that they disarrange and wear off the mane, and that they are apt to scar and injure the animal.

The object of this invention is to construct a light, strong, and durable poke that is free from these objections, and is most effective for the purpose for which it is designed.

The invention consists of a poke composed of two rigid, looped, or slotted side pieces suspended from a headstall and designed to rest against the jaws of the animal; of a horizontal bent or double bar engaged and sliding on the side pieces, and having a smooth or rounded end to come in contact with the animal's throat; and, further, of hooks engaged in the side pieces to prevent the poke from being thrown up by the animal; and of a nose-piece that is brought down upon the animal's nose when the poke-bar is forcibly pushed back.

Figure 1 is a side elevation of the poke in position on a horse. Fig. 2 is a front elevation of the poke.

Similar letters of reference indicate corresponding parts.

In the drawings, A represents the headstall portion of the poke, in the side loops, *a*, of which are engaged the hooked ends of the rigid side pieces, B, that extend downward by and below the animal's jaws, and have eyes *b* formed in them at about midway of their length, and slots or loops *c* extending from said eyes *b* to their lower ends.

The poke-bar C consists of a rod bent double, with its ends united by a thimble or band, *d*, and provided at this point with a downward and inward bent finger, *f*, to keep the poke from the ground and cause it to slide along easily on the surface thereof. The rear or bend of the poke-bar C has an outward curve that is designed to come in contact with the animal's throat when the front end is forced in contact with any obstruction.

The open poke-bar C is passed through the slots or loops *c* of the side pieces, B, and rests in rear of said side pieces, B, in hooks D, that hang on either side from the eyes *b* of said side pieces, B. A transverse pin, *g*, is passed through each arm of the poke-bar C, between the side pieces, B, and the hooks D, thereby preventing said bar C from moving too far forward. A nose-piece, E, bent to conform with the animal's nose, and being, preferably, a continuation or extension of the hook D, has its ends secured in or near the eyes *b* of the side pieces, B, and is designed to extend upward over the animal's nose.

When the poke is in position on a horse, as shown in Fig. 1, the horse can easily feed through the poke-bar C, between the arms thereof; and should the animal attempt to jump a fence the point of said bar would strike the said fence, and the rear end of the bar would be thereby forced against the animal's throat and the lower ends of the side pieces, B, be at the same time forced rearward, with the effect of bringing the nose-piece E down upon the animal's nose, and thereby checking him completely. Thus it will be seen this improved poke will be quick and effective in its action without injury to the animal.

I do not confine myself to the precise construction of parts as herein shown, as it is evident that it may be modified without departing from my invention.

Having thus described my invention, I claim as new and desire to secure by Letters Patent—

1. An animal-poke constructed substantially as herein shown and described, consisting of rigid slotted side pieces, B, suspended from a headstall, A, poke-bar C, adjustably attached to the side pieces, supporting-hooks D, and nose-piece E, operating as set forth.

2. The combination, with the rigid side pieces, B, having the eyes *b* near its middle, and the loops *c*, extending from said eyes, of the poke-bar C, having ends passing through said loops and held together, as described.

3. The combination, with the poke-bar C, passing through the side-piece loops *c c*, of the hooks D, hanging from side-piece eyes *b*, as and for the purpose specified.

LORENZO STOW.

Witnesses:
   W. S. HIBBITT,
   A. NORMAN.